United States Patent Office 3,564,702
Patented Feb. 23, 1971

3,564,702
METHOD AND APPARATUS FOR PREFABRICATING TIMBER FRAMES
James Hurn, Rowley, Melksham, Wiltshire, England;
Charles R. F. King, 6 Somerset Lane, Bath, Somerset, England; and Donald R. Deane, Foxhall Farm, Weston, Bath, Somerset, England
Filed Aug. 19, 1968, Ser. No. 753,399
Claims priority, application Great Britain, Aug. 23, 1967, 38,789/67
Int. Cl. B23p 19/00, 19/04
U.S. Cl. 29—430                                       18 Claims

ABSTRACT OF THE DISCLOSURE

Method and apparatus for manufacturing prefabricated timber frames, wherein adjustably movable carriage means is provided for moving stringers comprising a part of the frame past a fixed nailing station where studs are nailed to the stringers so that the centers of the studs may be varied.

---

This invention relates to methods and apparatus for manufacturing prefabricated timber frames.

Timber frame are employed in a wide variety of uses, and machines are known which can produce a series of substantially identical frames having unchanging sets of dimensions. However, the use of timber frames for buildings is assuming increasing importance, and in this particular field, standardisation is difficult if not impossible to obtain. It is hence desirable for a frame prefabricating machine to be capable of being adapted to produce, within the limits imposed by the maximum longitudinal and transverse frame dimensions which the machine can accommodate, a substantially infinite variety of frames which differ from one another as to their dimensions. For example, in timber frames for houses, the longitudinal head and sole members (hereinafter for convenience termed "stringers") may differ from frame to frame and may be of any cross-sectional size and of a length up to say 30 ft. or more. In the case of the members which extend between the head and sole stringers (and which are hereinafter termed "studs"), these may not only differ in length, from frame to frame, but any one frame they may be at varying centres, and may also be of different sectional sizes. Accordingly, the production of each individual frame is usually treated as a "one-off" operation to be performed manually. If such a "one-off" operation were to be accomplished employing jigs, much time and trouble would be entailed in setting up.

This invention has for one object to provide a method and apparatus for manufacturing timber frames in which many of the operations previously performed manually are effected mechanically, with the successive operations being susceptible of control by programming mechanisms, for example by the tape programmed positioning and sequence control mechanisms already widely used. For example, a suitable positioning control mechanism is described in British Pat. No. 904,734.

A further object of the method and apparatus of this invention is to enable one or more of the dimensions of the frame successively produced by the process to be easily varied while maintaining accuracy.

Broadly stated, the present invention provides a method of manufacturing timber frames which includes the steps of:

(a) Assembling parallel head and sole stringers and nailing a stud transversely therebetween them at a datum line, (b) Then moving the stringers longitudinally with a conveying means over a predetermined distance from said datum line, (c) Clamping the stringers after they had been so advanced.

(d) Inserting a second stud between said stringers on said datum line, (e) Clamping said second stud in this position, (f) Nailing the stringers to the opposite ends of the studs, (g) Releasing the clamp means engaging the stringers and the stud and followed by (h) Again moving the stringers longitudinally with said conveying means over a predetermined distance from said datum line.

The distance over which the stringers are moved longitudinally between the successive nailing operation will determine the ditsance between the successive studs, and such longitudinal movement is preferably effected by a linear control mechanism such as a rack and pinion or fluid ram or analogous device such as a lead screw whose rotation is in turn controlled by a position sensing and control mechanism which is programmed accordingly.

By the term "nailing" as used throughout this specification and the appendant claims, we mean that the stringers may be secured to the studs by nailing or any mechanically equivalent fastening operation. For example, dowels, staples, woodscrews, pronged plates or corrugated strips inserted laterally of the joint may be used for this purpose. The nailing may be effected by rigidly mounted automatic gun or by hand held guns, or it may be effected by nailing by hand.

As nailing always occurs at the datum line, the provision of automatically operated nailing devices presents no difficulties, while the spacing between the studs is dependent upon the distance over which the stringers are advanced following the nailing of each stud.

By employing a leadscrew controlled conveying system the stringers may be advanced with great accuracy over varying distances during a succession of steps should the design of the frame so require.

The successive steps of operation are conveniently governed by a pre-programmed control mechanism which might well be arranged so that some or all of the successive steps of the operation require to be initiated by the operator, e.g. by push button; this providing a method of ensuring that the immediately preceding operational step or steps has been correctly carried out.

The programmed control mechanism, which could be programmed to produce a range of different frames in succession should the occasion so arise, may also be arranged to indicate, for example, at an indicator window the quantity and dimensions of the timber components required to be inserted into the machine at any given stage of working. The control mechanism would stop the machine when such an insertion became due, leaving the operator to restart the machine when he has ensured that the insertion has been correctly completed.

The timber component members may be precut to the correct length, stacked in a series of hoppers and fed automatically to the machine, this applying particularly in the case of the transverse studs. The machine may have associated with it a saw for cutting the stringers accurately for length towards the final stage of completing an individual frame.

However, in some cases to reduce the complexity or cost of the apparatus, or where a large variety of components are used successively, the frame fabricating machine will be located adjacent to and operated in conjunction with a sawing machine. In this case the pre-programmed control mechanism might be programmed to exhibit for example through an indicator window, to the operator of the sawing machine, the quantity and dimensions of the timber components he is to prepare, in advance of when such component is to be inserted into the frame fabricating machine. Furthermore, the control mechanism may be utilized to control the sawing machine so that the correct length is cut.

By employing as clamping devices fluid actuated rams forming part of a pneumatic or hydraulic control circuit, control of the successive clamping operations can readily be effected by the pre-programmed control mechanism and in addition such rams can accommodate without adjustment a range of variation in sectional size of the timber components being processed. Electro magnetically operated clamps could be employed instead but are not preferred.

The invention will be described by way of example with reference to the accompanying drawings in which:

FIGS. 4 and 5 are cross-sectional views taken on the lines IV—IV and V—V respectively of FIG. 1, while

Figure 9:
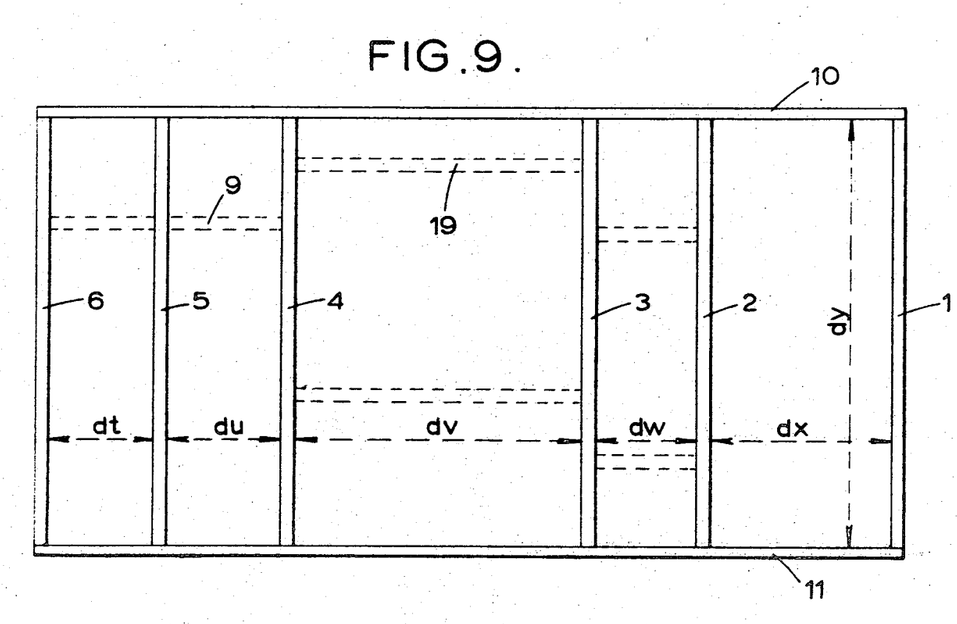
FIG. 9 is a view of a typical prefabricated timber frame.

We refer first to FIG. 9, which shows a typical timber frame for use in buildings. The frame shown comprises upper and lower longitudinal head and sole members (hereinafter referred to as "stringers") indicated by reference numerals 10 and 11 respectively. Fixed between the stringers 10 and 11 are vertical members 1, 2, 3, 4, 5, 6, herein termed as studs.

The length of the stringers 10 and 11 may vary from one frame to another as may the length of the studs 1, 2, 3, 4, 5 and 6. There may be any number of studs extending between the stringers 10 and 11 and the spacing $dt$, $du$, $dv$, $dw$, $dx$, between adjacent studs may vary both from one to another and from frame to frame. $dv$ in the drawing represents the interval between the stringers 10 and 11.

The present invention has for its object the provision of a method and apparatus of manufacturing frames such as that shown in FIG. 9, in which the successive complete frames manufactured may either be identical or, where the distances $dt$, $du$, $dv$, $dw$, $dx$ and $dy$ of successive frames may vary between one frame and another. The production of such one-off frames has hitherto been performed manually and the invention has for a further object to provide a method and apparatus whereby many of the operations involved in the production of such one-off frames are performed mechanically and the successive steps involved in the operation are susceptible of control by programming mechanisms, for example positioning and sequence control mechanisms governed by pre-programmed punched or recording tapes. Such mechanisms are already widely used.

The method and apparatus provided by the invention will be apparent from the following description of the machine illustrated in FIGS. 1 to 8 of the drawings.

Figure 1:
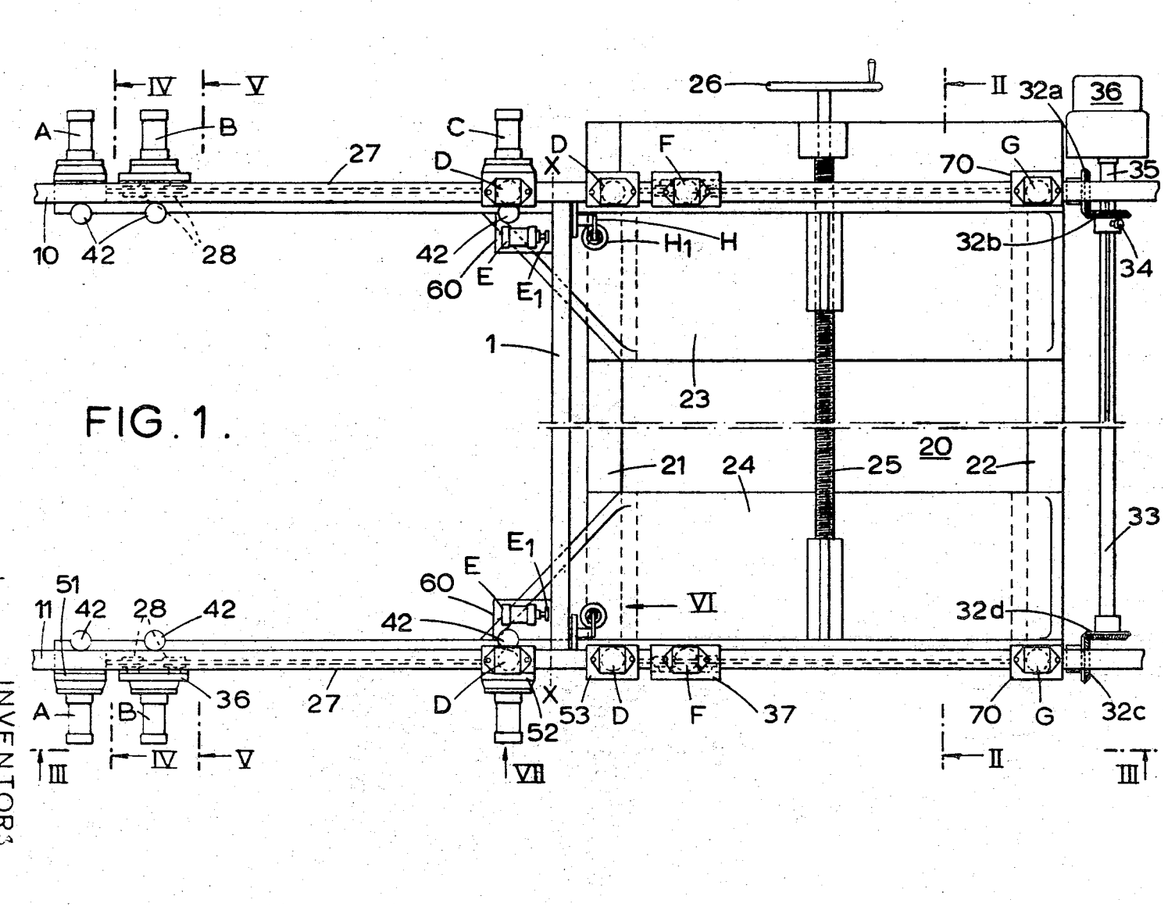
FIG. 1 is a plan view of a timber frame prefabricating machine.
Figure 2:
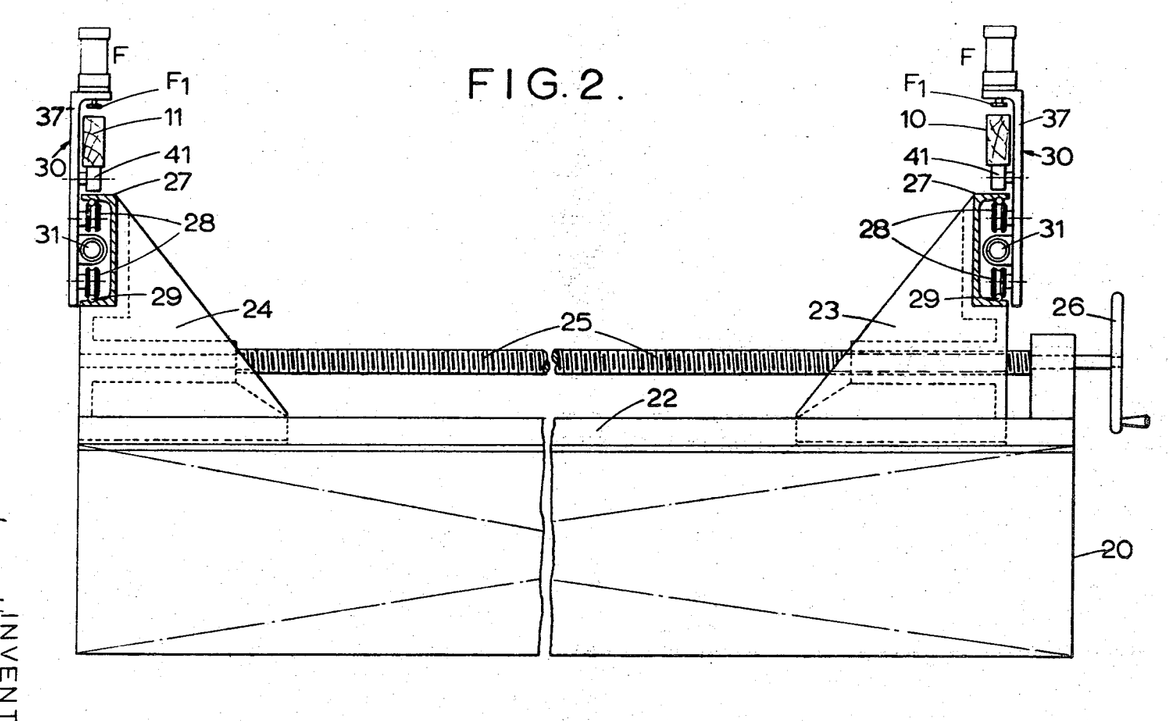
FIG. 2 is a cross sectional view taken on the lines II—II of FIG. 1.
Figure 3:
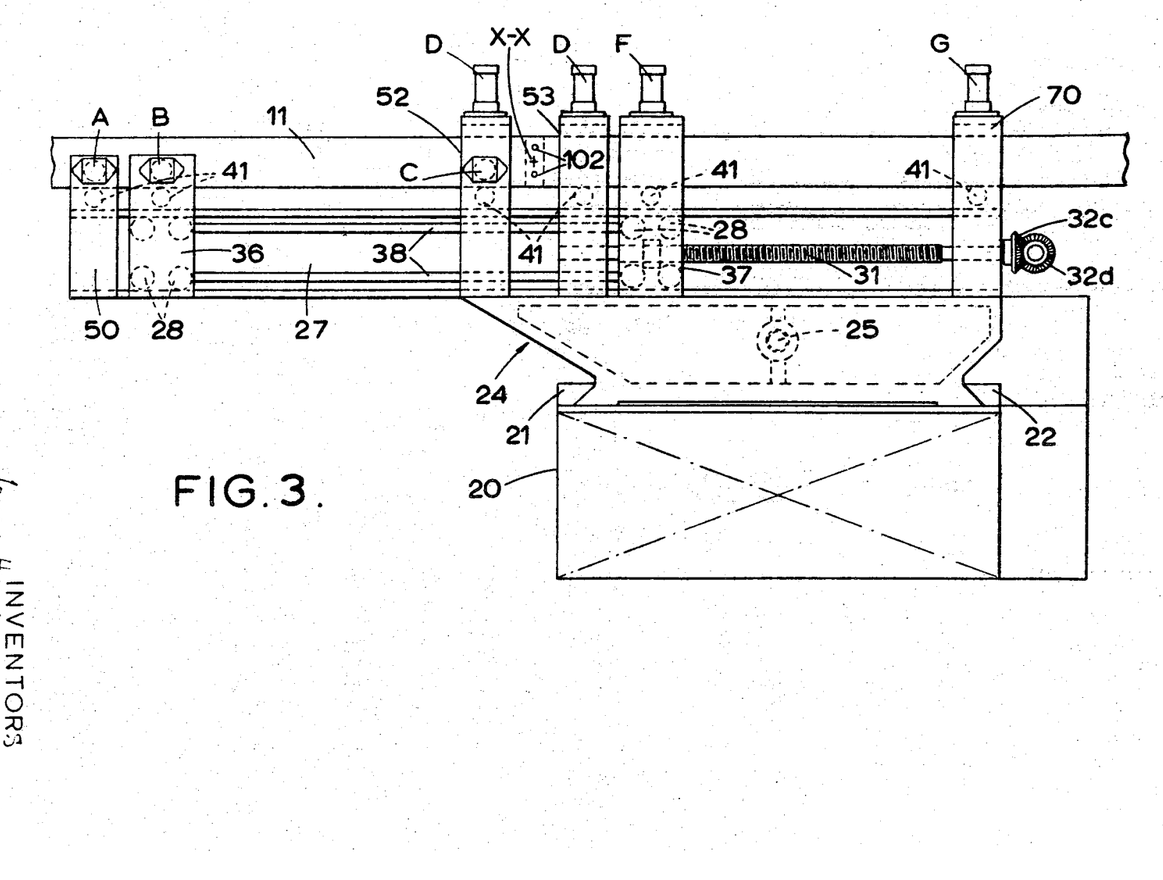
FIG. 3 is a side view of the machine shown in FIGS. 1 and 2.
Figure 4:
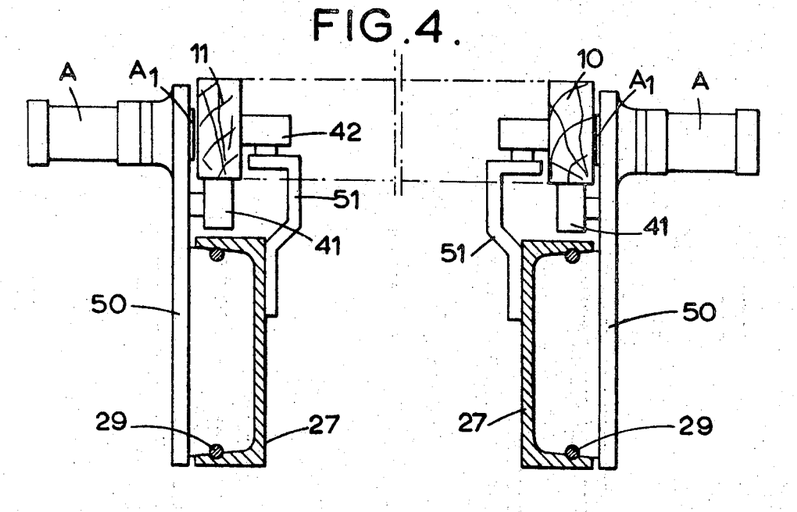
Figure 5:
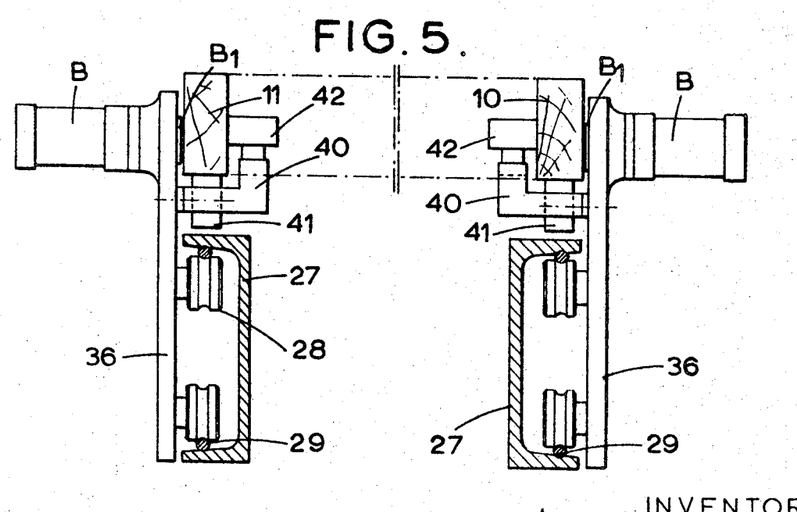

As will be seen from FIGS. 1, 2 and 3, in particular, the machine has a fixed base 20 on the upper side of which are transverse slides 21 and 22 which support for sliding movement over the base a pillar 23. Fixed on one side of the base is a pillar 24 which is of similar configuration to the pillar 23 except that it does not move. Movement of the pillar 23 towards or away from fixed pillar 24 is effected under the control of an adjusting screw 25 which is rotatable under the control of handwheel 26, the threads of the screw 25 engaging a threaded sleeve fixed in pillar 23.

Each of the pillars 23 and 24 mounts a beam 27 which extends longitudinally of the machine over the full length thereof, and which may be of any cross-sectional shape but which in the embodiment illustrated is a channel member. Slidable along the channel members on rollers 28 riding on tracks 29 fixed in the channels are carriages generally designated 30. Control of the longitudinal movement of the carriages 30 is by lead screws 31 arranged to rotate in synchronism through the medium of bevel gears 32a, 32b, 32c and 32d and cross shaft 33.

The bevel gear 32b on the cross shaft 33 driving the lead screw 31 associated with the moving pillar 23 is keyed to the shaft 33 and is movable longitudinally along the shaft 33 upon release of a lock nut 34 which when tightened again keys that bevel 32b to the shaft 33. This arrangement permits adjustment of the drive to the lead screw associated with sliding pillar 23 as the latter has been adjusted towards or away from pillar 24. Either the lead screw associated with the fixed pillar 24, or the cross shaft 33 may be driven. However, for the sake of clarity, the cross shaft is shown driven by an input drive shaft 35 from a gear box 36.

The carriages, generally designated 30, comprise front and rear brackets 36 and 37 each carrying four rollers 28, the front and rear brackets 36 and 37 being spaced apart by twin tie rods 38.

Carried on front brackets 36 (as shown in particular in FIG. 5) are cranked arms 40 carrying a vertical guide roller 41 rotating about a horizontal axis and a horizontal guide roller 42 rotating about a vertical axis. Also carried on brackets 36 are horizontally acting clamps generally designated B. The clamps B are fluid operated and have a piston indicated at B1 which can be driven towards or away from the guide roller 42.

Fixed at the front ends of channels 27 are brackets 50 and 51 (FIGS. 1 and 4) which respectively mount further vertical and horizontal guide rollers 41 and 42 respectively. The brackets 50 mount fluid operated clamps generally designated A having pistons A1 movable under fluid control towards or away from the horizontal guide rollers 42.

As will be seen from FIGS. 1 and 3, mounted on each of the channels 27 in their mid-region are two brackets 52 and 53. These are shown in greater detail in FIG. 6 in the case of the bracket 52 and FIG. 7 in the case of both brackets. The brackets 52 and 53 mount vertical guide rollers 41. Both brackets 52 and 53 mount vertically operating fluid operated clamping devices D having pistons D1 movable towards or away from the vertical guide rollers 41 under fluid control.

The brackets 52 and 53 are situated on either side of an notional transverse line indicated at X—X in FIG. 1, which is referred to hereafter as "the datum line" and it is on this line as will be described below that nailing takes place.

The bracket 52 on the upstream side of the datum line X—X mounts a horizontally acting fluid operated clamping device C having a piston C1 which is movable towards or away from a horizontal guide roller 42 carried by a bracket generally designated 60 fixed to channel members 27.

Also carried on the brackets 60 are fluid operated clamps E which operate horizontally and longitudinally of the machine as will be described below.

Figure 6:
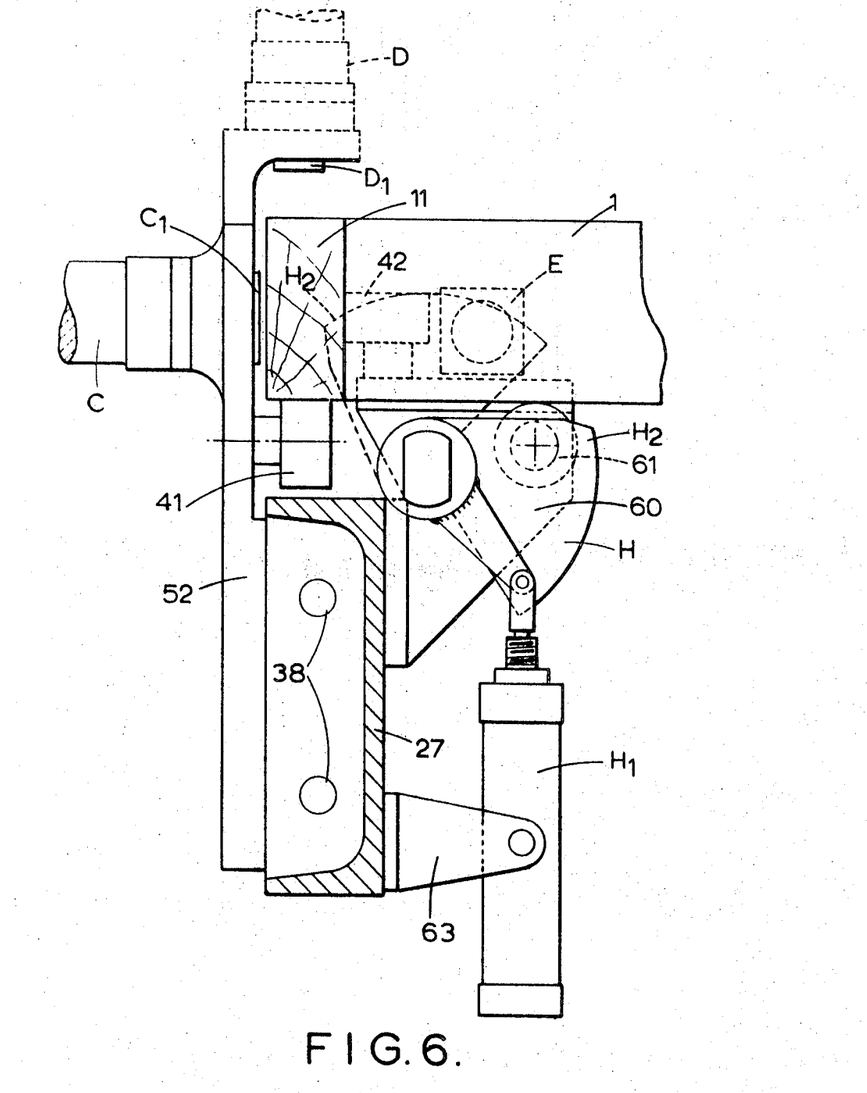
FIGS. 6 and 7 are detail views to a larger scale taken in the direction of the arrows VI and VII respectively of FIG. 1, and FIGS. 8a, 8b, 8c, 8d, 8e, 8f, 8q, and 8h are diagrammatic views illustrating the sequence of operation of the machine.
Figure 7:
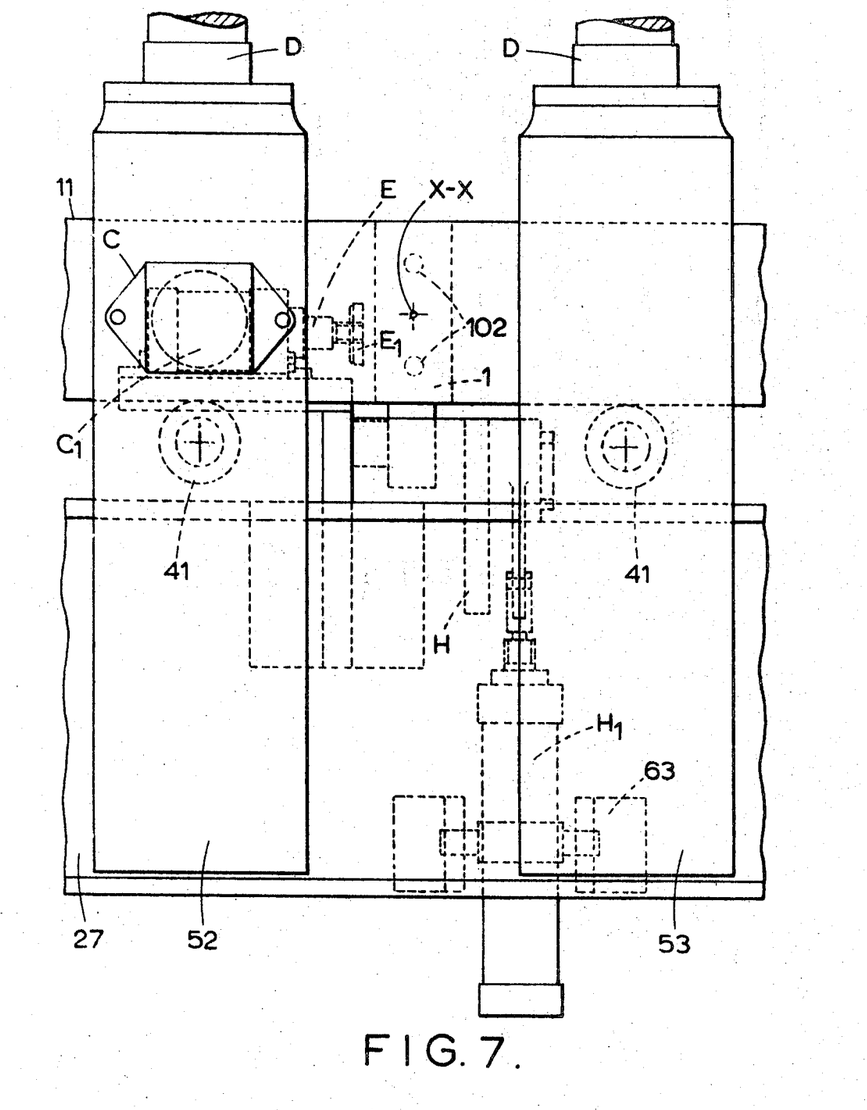

Referring particularly to FIG. 6, also carried on brackets 60 is a vertical stop 61 whose upper level is the same as that of the rollers 41 and which in the embodiment illustrated is constituted by a roller which is rotatable about an axis which although it is in the same plane as the axis of the rollers 41, it is at right angles thereto. The vertical stops 61 are located at the datum line X—X.

Pivotal about an axis parallel to that of the roller constituting each vertical stop 61 is an end stop H which is movable from the position shown in full lines in FIG. 6 to the position shown in dotted lines under control of a fluid operated cylinder device H1 carried on a bracket 63 in turn fixed to channel 27. It will be understood with reference to FIG. 6 that a similar arrangement but to the opposite hand, is carried by the channel member 27 associated with the movable pillar 23 on the opposite side of the machine.

The rear bracket 37 of each carriage 30 mounts a vertical guide roller 41 and above this a vertically fluid operated clamping device F having a piston F1 as shown in FIG. 2, movable towards or away from the vertical guide roller 41 under fluid control.

Mounted on the channels 27 at each side of the machine on the downstream side of datum line X—X referring to FIG. 1 is a bracket 70 (FIGS. 1 and 2) mounting a vertical guide roller 41 and a vertically acting fluid operated clamping device G which has a piston movable under fluid control towards or away from the roller 41 carried by the bracket 70.

In summary, and as it will be understood from the foregoing, the fluid operated clamping devices B and F are fixed to the movable carriages 30 and move therewith while all the remaining fluid operated clamping devices are fixed with respect to their associated channels 27 which are fixed longitudinally relative to their associated pillars 23 and 24. The carriages are movable along the channels 27 under the control of lead screws 31, which in the embodiment shown, require to be oppositely threaded, while movement of the pillar 23 together with its associated channel 27 and together with this channel, its various clamps as well as the end stop device H on that side of the machine are movable towards or away from the pillar 24 together with its associated channel 27 and various clamping devices and end stop H, under control of lead screw 25 rotated by handwheel 26 to provide adjustment for width of the machine. When the operating width of the machine is adjusted, the bevel 32b associated with the movable pillar 23 requires to have its lock nut 34 released so that the bevel can be slid along key shaft 33 and retightened on the shaft to permit drive to be maintained to the lead screw 31 associated with movable pillar 23.

OPERATION OF THE DEVICE

The operation of the device will now be described with reference to the drawings 8a, 8b, 8c and 8d, which illustrate diagrammatically only some components concerned in successive stages of operation. Where necessary reference will be had to the other drawings.

The horizontal guide rollers 42 at each side of the machine are aligned and constitute fences indicated diagrammatically at 100 in FIG. 8.

Figure 8A:
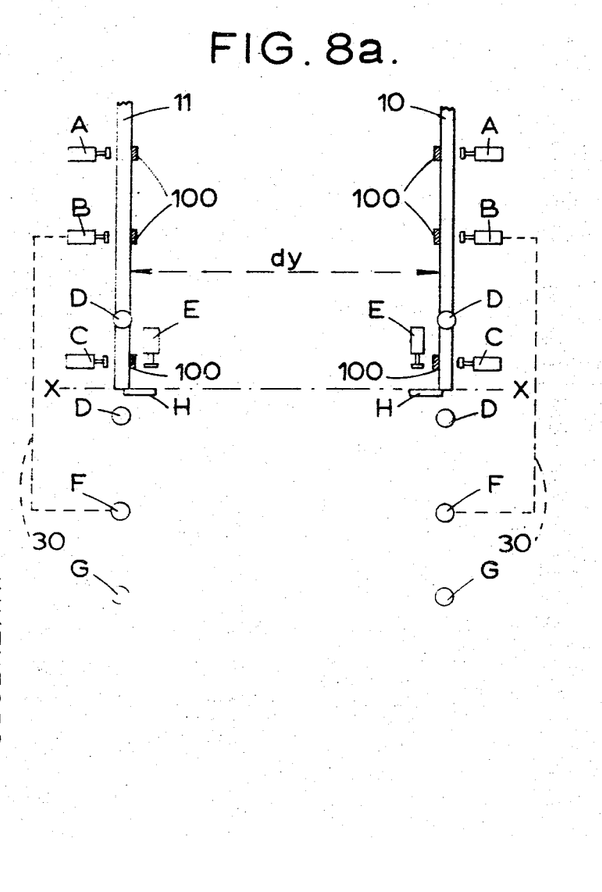

At the commencement of a frame forming operation, head and sole stringers 10 and 11 respectively, which have been previously cut to length, are laid against the fences 100 and advanced manually towards the datum line X—X until they abut with end stops H which have previously been raised under the control of pneumatic cylinders H1 and which end stops H1 have noses H2 (indicated in FIG. 6) which engage the ends of the stringers and arrest further advance of the stringers 10 and 11 (FIG. 8a).

If the machine has not previously been adjusted for width, this is now effected in the manner previously indicated and by rotation of handwheel 26, so that the distance between the stringers 10 and 11 corresponds to the desired distance ($dy$ in FIG. 9). With this effected the machine is set up and automatic control can be applied to the steps which follow as described below.

Figure 8B:
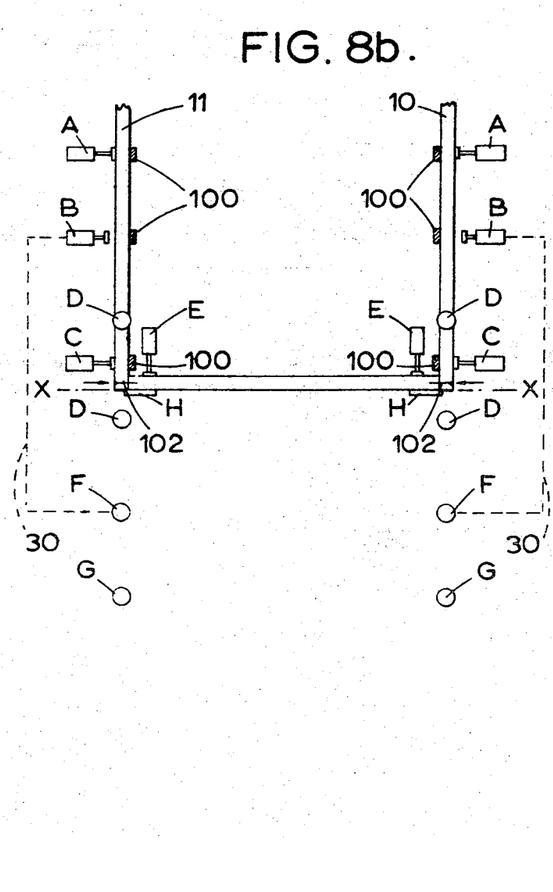

All clamps A, C, D and G are operated so that the pistons of the clamps A, C and D engage the stringers 10 and 11. At the same time (as indicated in FIG. 8b) a first stud is placed so that it lies on the stops 61 and extends transversely between the stringers 10 and 11. The end clamps E are then operated to engage the stud 1 so that it is urged against the stops H, whereafter nails indicated at 102 may be driven through the stringers and into the first stud 1 (FIG. 8b).

Nailing may be performed either manually with a nailing gun or automatic nailing guns may be provided for this task. Nailing is performed on the datum line X—X in the space between brackets 52 and 53 (FIG. 7) and automatic nailing guns may be mounted either on the channels 27 or on the pillars 23, 24 which guns operate in the space between the brackets 52 and 53.

Supply of studs may be from a hopper situated above the machine, the studs having previously been cut to length.

At any time while the clamps B and F are disengaged from the stringers, the lead screws 31 are operated to move the carriages 30 so that the clamps B are brought towards clamps A and stopped. Clamps B and F are then operated so that clamps B engage the stringers 10 and 11.

Figure 8C:
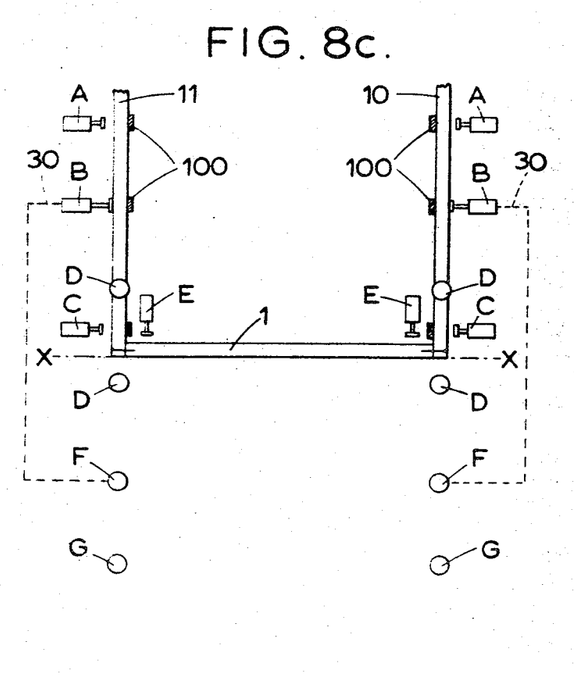

After nailing, clamps A, C, D and G are operated so that clamps A, C and D are released from the stringers and the cylinders H1 are operated to cause the end stops H to pivot to the position shown in full lines in FIG. 6, so they no longer obstruct forward movement of stringers 10 and 11. Clamps E are also released at this stage (FIG. 8c).

Figure 8D:
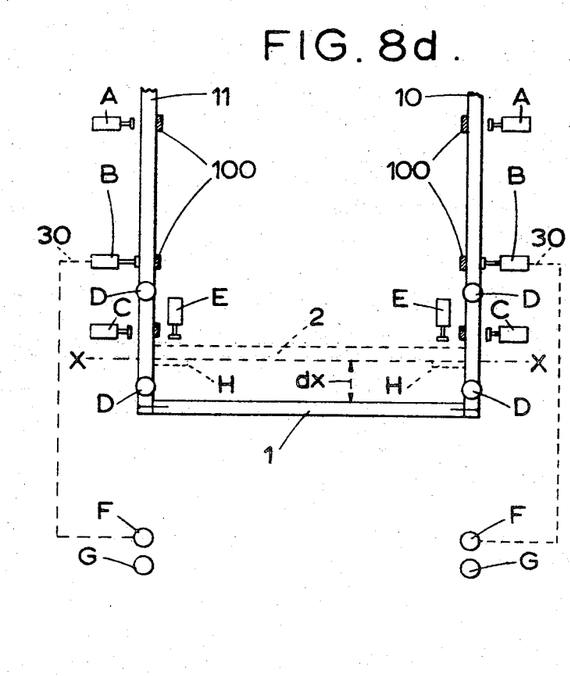

The stringers are now engaged only by the carriage clamps B and on rotation of the lead screws 31 the carriages move longitudinally of the channels 27 so that the stringers 10 and 11 are advanced together with the previously nailed stud 1 (FIG. 8d). The distance over which the stringers are advanced under the control of the lead screws correspond to the interval between the first stud 1 and the next adjacent stud 2 and the stud 1 is moved from the datum line X—X over this distance ($dx$ in FIG. 9).

As the stringers advance they ride on the vertical guide rollers 41 and against the horizontal guide rollers 42.

Figure 8E:
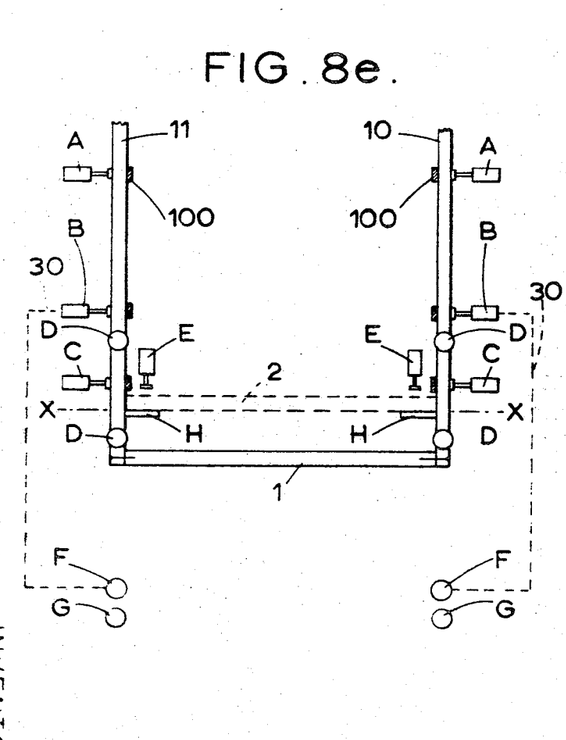

When the stringers 10 and 11 together with the first stud 1 have been advanced over a distance corresponding to $dx$, the leadscrews 31 are stopped and the fixed clamps A, C and D are operated to engage the stringers (FIG. 8e).

Figure 8F:
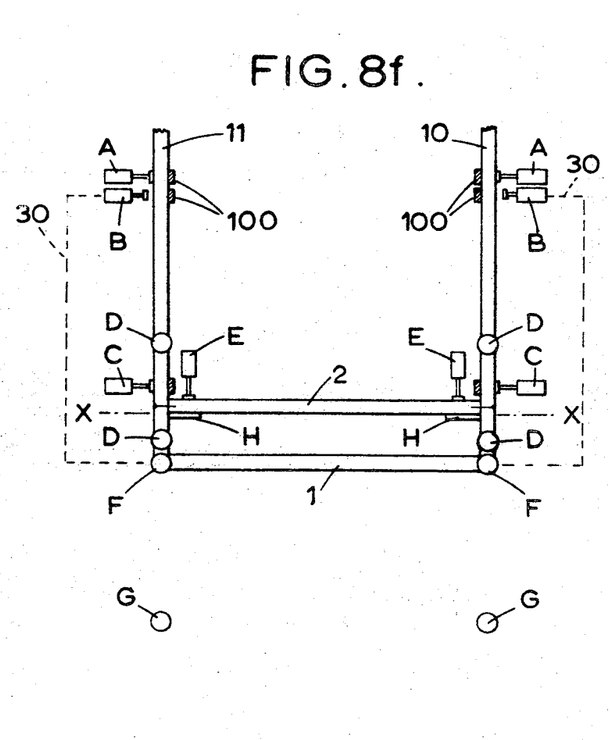
Figure 8G:
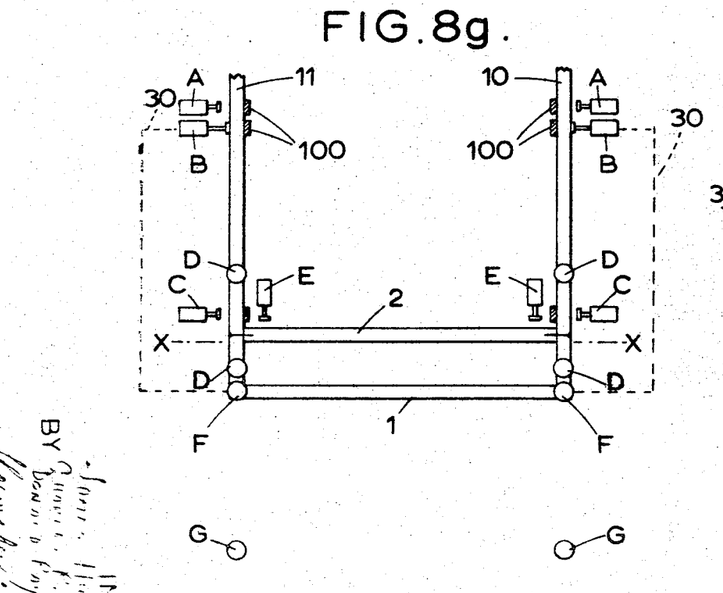

As soon as the fixed clamps hold the stringers, the carriage clamps B and F can be disengaged and the lead screws 31 can be operated to return the carriages 30 towards the fixed clamps A (FIG. 8f).

Soon after the completion of the advance movement of the stringers the end stops H are raised. However, owing to the advance of the stringers 10 and 11 the end stops H cannot be fully raised, since their noses H2 strike the sides of the stringers.

When the end stops H have been raised, a second stud 2 is placed on the vertical stops 61 at the datum line X—X, between the stringers 10 and 11 and against the end stops H FIGS. (8d and 8e). Longitudinal end clamps E are operated to hold the stud 2 against the end stops H and in this condition nailing of the second stud 2 can be performed.

When the operation has advanced sufficiently, the stringers 10 and 11 will have proceeded some distance from the nailing clamps D and may require steadying. This is achieved by the clamps G which will be generally operated together with the nailing clamps D.

Towards the completion of the frame (as the stud 6 (FIG. 9) is being inserted) the clamps A, B and C no longer engage the stringers 10 and 11 which instead are held by the clamps F, G and the clamp D on the downstream side of the datum line and these clamps are employed to clamp and move the stringers.

The sequence after nailing of the first stud is repetitive except that the distances over which the stringers are advanced after each stud has been nailed, may be varied to correspond to the desired intervals between specific studs. Such variations will be obtained by governing rotation of the leadscrews 31 controlling movement of the carriages 30.

A typical sequence of operation following the nailing of the first stud (FIG. 8b) might be as follows:

(a) Stops H moved out; E unclamp, B, F, clamp on; A, B, C, D, unclamp (FIG. 8c).

(b) Leadscrews 31 advance B, F required distance (FIG. 8d.)

(c) Stops H move in; A, B, C, D, G, clamp on (FIG. 8e).

(d) B, F, unclamp; next stud placed on datum line X—X; E, clamp on; nailing (FIG. 8f).

(e) Leadscrews 31 return B, F, required distance between centres.

(a) E, unclamp; stops H moved out; B, F, clamp on; A, B, C, D, G, unclamp (FIG. 8g).

Figure 8H:
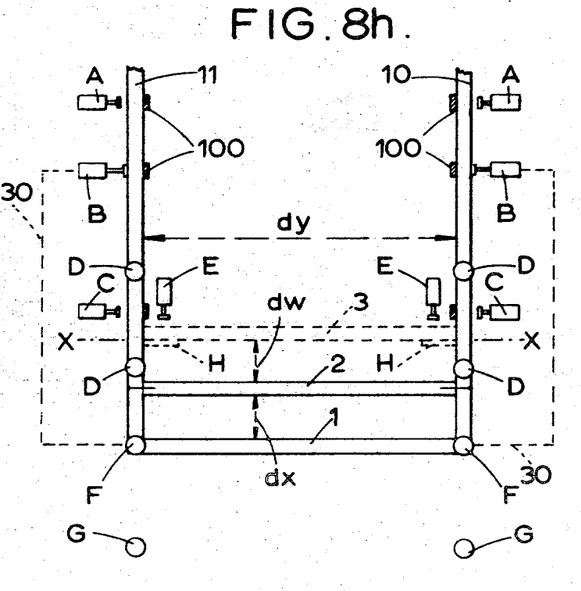

(b) Leadscrews 31 advance B, F, required distance (FIG. 8h).

(c) Stops H move in; A, B, C, D, G, clamp on.

(d) B, F, unclamp; next stud (3) placed on datum line X—X; E clamp on; nailing.

(e) Leadscrews 31 return B, F, required distance between centres; and so on repeating steps (a), (b), (c), (d) and (e) until all the studs required have been inserted.

FIG. 9 also shows struts 9, 19 which may be inserted subsequently during later processing of the frame which may include the steps of applying cladding to the frame, inserting doors or windows or other operations as required.

According to a preferred feature, there are arranged at or adjacent to the datum line X—X, Inking or Marking devices which are automatically controlled and which mark the timber with the information intended to assist subsequent operations, e.g. where the struts 9, 19 are to be positioned or where cladding is to be applied.

The successive operations are susceptible to control in sequence by a preprogrammed control mechanism since the various operations are repeated in each cycle leading up to the nailing of each stud. The single exception is that the intervals dt, du, dv, dw, dx may vary from one to the other. However, this variation may be catered for by employing a programmed control mechanism which is capable of governing rotation of the leadscrews 31.

Instead of there being two carriages 30 respectively governed by leadscrews 31, the carriages may be rigidly connected to form in effect a single carriage which may be governed by a single lead screw. In general however, the arrangement illustrated is provided since it permits an operator to take up a position in the centre of the machine where he can supervise the various operations and particularly the feeding of the studs. Moreover, the provision of a single carriage system entails difficulties and limitations so far as the range of adjustment for width is concerned.

In conclusion, the principal advantages achieved by the apparatus and method provided according to this invention may be summarised as follows:

(a) By the feature that the stringers are progressively moved past a fixed nailing position, economy of space and weight can be achieved as compared with systems where the stringers are held stationary and an overhead travelling hopper and nailing mechanism accomplishes stud insertion and nailing.

(b) By the provision of the moving carriage and leadscrew control, variation in the centres of the studs either of a single frame, or of successive frames being processed, is readily accommodated wtih accuracy. A large range of variation in the centres (dt, dx, etc.) can be accommodated.

(c) A large range of variations in the operating width (dy) can be accommodated, while the use of fluid operated rams as clamping devices enables timber of varying sectional size to be catered for.

(d) The sequence of operations is readily susceptible to control by a pre-programmed position and sequence control mechanism, and in this case the operation of the machine requires supervision by but a single operator.

This last is of great importance when it is considered that a timber framed house may involve thirty or more frames many of which are different from one another. When these are fabricated manually, the task of setting up jigs and marking the timber is time and labour consuming while access has to be had to the jig from all sides, thereby consuming space.

The present invention enables the frames to be produced on a flow line principle with consequent savings of time, labour and space. Work which with manual methods has been performed in 10 man/hours has with a machine according to the invention, been completed in 8 man/hours.

We claim:

1. A method of manufacturing a timber frame which includes the steps of:

(a) assembling parallel head and sole stringers and nailing a stud transversely therebetween them at a datum line, (b) then moving the stringers longitudinally with a conveying means over a predetermined distance from said datum line, (c) clamping the stringers after they had been so advanced, (d) inserting a second stud between said stringers on said datum line, (e) clamping said second stud in this position, (f) nailing the stringers to the opposite ends of the stud, (g) releasing the clamp means engaging the stringers and the stud, and followed by (h) again moving the stringers longitudinally with said conveying means over a predetermined distance from said datum line.

2. A method of manufacturing a timber frame which includes the steps of:

(a) assembling a pair of head and sole stringers in parallel relationship against guide means carried on a fixed bed, (b) employing fixed clamping means to clamp the stringers to the guide means, (c) clamping a first stud transversely between the stringers at a datum line and nailing the stringers to the stud, (d) engaging said stringers with clamps mounted on carriage means movable longitudinally over the bed under the control of leadscrew means, (e) releasing the fixed clamping means so that the stringers are no longer held thereby, (f) employing said leadscrew means to advance the carriage means over a predetermined distance so that the first stud fixed to the stringers is advanced from the datum line over a distance equal to the distance moved by the carriage.

(g) with said fixed clamps, clamping the stringers to the fixed guide means, (h) releasing the carriage clamps so that the stringers are no longer held thereby, (i) placing a second stud transversely between the stringers on the said datum line and clamping said second stud so that it is immovable relative to said fixed guide means, (j) nailing the stringers to the second stud.

3. A method as defined in claim 2, wherein the distance over which the stringers are moved longitudinally between successive nailing operations corresponds to the distance desired between studs for a particular frame being made.

4. A method as defined in claim 2, including the steps of operating the fixed clamps and the carriage clamps by means of a fluid circuit, with control of said circuit and of the rotation of the leadscrew means being effected through a position and sequence control mechanism of the kind which is in turn governed by preprogrammed punched tape or other recording tape.

5. Apparatus for manufacturing a timber frame including:
 (a) a fixed bed,
 (b) two parallel rows of fixed guides on the bed and co-operating with said guides fluid operated clamping devices which are operable to engage a pair of timber stringers to hold them respectively against the respective rows of guides and to prevent them from being moved longitudinally,
 (c) conveying means movable over the bed longitudinally with respect to said rows of guides,
 (d) fluid operated clamping devices carried by said conveying means and operable to engage and hold said stringers,
 (e) a linear control mechanism for effecting longitudinal movement of the conveying means.

6. Apparatus according to claim 5, wherein the fixed guides are in the form of rollers arranged to rotate about generally vertical axes.

7. Apparatus according to claim 5, including aligned rollers each arranged to rotate about generally horizontal axes adapted and arranged to support said timber stringers for longitudinal movement past said fixed guides.

8. Apparatus according to claim 5, wherein the linear control mechanism includes a leadscrew associated with the conveying means with rotation of said leadscrew causing longitudinal movement of the conveying means.

9. Apparatus according to claim 5, wherein there is mounted on said bed firstly a fixed pillar and secondly a moveable pillar which is adjustable towards or away from said fixed pillar.

10. Apparatus according to the preceding claim 9, wherein each pillar mounts a rigid beam member extending longitudinally of the machine, the beam members mounted on the respective pillars being parallel to one another.

11. Apparatus according to the preceding claim 10, wherein each beam member mounts one of said rows of fixed guides and the fixed clamping devices co-operating with the fixed guides, and wherein the conveying means are slidable longitudinally of said beam members.

12. Apparatus according to the preceding claim 11, wherein the conveying means comprise a carriage, one associated with each beam member, each carriage being guided for movement longitudinally of its associated beam and each carriage mounting fluid operated clamping devices operable to engage and hold a timber stringer.

13. Apparatus according to claim 10, wherein each carriage has associated with it a leadscrew, rotation of which is effective to move the carriage longitudinally of its associated beam member.

14. Apparatus according to claim 11, wherein the leadscrews associated with each of the carriages are ganged to rotate together.

15. Apparatus according to claim 10, wherein each beam member mounts a pair of fixed downwardly acting fluid operated clamping devices spaced apart and respectively located on either side of a nailing position and operable to engage and hold a stringer while it is nailed to a timber stud laid transversely to it.

16. Apparatus according to claim 15, wherein each pillar mounts a pivotal stop member which is movable under pneumatic control, to and from an operative position and including a fluid operated clamping device arranged in association with the said stop member and operable to engage a timber stud to hold the stud against the stop member.

17. Apparatus according to claim 8, wherein said moveable pillar is mounted on slides provided on said bed extending transversely of the machine.

18. Apparatus according to claim 12, wherein said beam member associated with each pillar is a channel member, and wherein the carriages have wheels running on tracks provided on the channel members.

References Cited
UNITED STATES PATENTS

| | | | |
|---|---|---|---|
| 3,319,323 | 5/1967 | Groat | 29—200 |
| 3,367,010 | 2/1968 | Lytle et al. | 29—200 |
| 3,431,619 | 3/1969 | Bowers, Jr. | 29—200 |

THOMAS H. EAGER, Primary Examiner

U.S. Cl. X.R.

29—200, 208